US011838415B2

(12) United States Patent
Allen

(10) Patent No.: US 11,838,415 B2
(45) Date of Patent: Dec. 5, 2023

(54) BLOCKCHAIN-IMPLEMENTED METHOD AND SYSTEM

(71) Applicant: nChain Licensing AG, Zug (CH)

(72) Inventor: Gavin Allen, London (GB)

(73) Assignee: nChain Licensing AG, Zug (CH)

(*) Notice: Subject to any disclaimer, the term of this patent is extended or adjusted under 35 U.S.C. 154(b) by 0 days.

(21) Appl. No.: 17/687,438

(22) Filed: Mar. 4, 2022

(65) Prior Publication Data
US 2022/0191021 A1 Jun. 16, 2022

Related U.S. Application Data

(63) Continuation of application No. 16/320,080, filed as application No. PCT/IB2017/054422 on Jul. 21, 2017, now Pat. No. 11,271,736.

(30) Foreign Application Priority Data

Jul. 29, 2016 (GB) .................................... 1613148
Jul. 29, 2016 (GB) .................................... 1613177
Jul. 29, 2016 (GB) .................................... 1613188

(51) Int. Cl.
*H04L 29/00* (2006.01)
*H04L 9/14* (2006.01)
(Continued)

(52) U.S. Cl.
CPC .............. *H04L 9/14* (2013.01); *G06F 21/305* (2013.01); *G06F 21/645* (2013.01);
(Continued)

(58) Field of Classification Search
CPC ....... H04L 9/14; H04L 9/0637; H04L 9/0643; H04L 9/0861; H04L 9/3263; H04L 9/50;
(Continued)

(56) References Cited

U.S. PATENT DOCUMENTS 10,454,677 B1 * 10/2019 Nagelberg ......... G06V 40/1365
2004/0181672 A1 * 9/2004 Ferri ....................... G06F 21/64
713/176
(Continued)

FOREIGN PATENT DOCUMENTS

WO   WO-2020263441 A1 * 12/2020 ........... G06F 21/316

OTHER PUBLICATIONS

Xu et al., "The Blockchain as a Software Connector," 2016 13th Working IEEE/IFIP Conference on Software Architecture (WICSA), Apr. 5, 2016, 10 pages.

*Primary Examiner* — Don G Zhao
(74) *Attorney, Agent, or Firm* — Davis Wright Tremaine LLP

(57) ABSTRACT

The invention provides a computer-implemented control method and corresponding system. The method may control or influence a device, system or other resource such as a technical process. The invention can provide a mechanism for emulating or otherwise executing the functionality of a logic gate via a computer-based distributed ledger (blockchain). This may be the Bitcoin blockchain or an alternative network/protocol. The invention provides logic embedded within a redeem script such that it determines which particular private keys have been used to sign an unlocking script, and then interprets the provision of those keys in accordance with a predetermined function. In a preferred embodiment, the method may comprise the steps of providing a blockchain Transaction comprising a redeem script for an output, wherein the redeem script: i) specifies a plurality of public keys, each associated with a corresponding private key; and wherein each public key is uniquely associated with a potential state of at least one data source; and ii) comprises logic arranged to provide a result based on which of the plurality of associated private key(s) is used to sign the unlocking script; wherein a minimum number of said (Continued)

private keys must be used to sign an unlocking script of a further blockchain Transaction in order to spend the output. Preferably, the logic is arranged to implement the functionality of a logic gate such as a NOT, AND, OR, NOR, XOR, IMPLY, NAND, NONIMPLY or XNOR gate.

16 Claims, 14 Drawing Sheets

(51) Int. Cl.

| | |
|---|---|
| *G06Q 20/38* | (2012.01) |
| *G06Q 20/36* | (2012.01) |
| *G06F 21/64* | (2013.01) |
| *G06F 21/30* | (2013.01) |
| *H04W 4/70* | (2018.01) |
| *G06Q 20/06* | (2012.01) |
| *H04L 9/06* | (2006.01) |
| *H04L 9/32* | (2006.01) |
| *H04L 9/08* | (2006.01) |
| *H04L 9/00* | (2022.01) |

(52) U.S. Cl.
CPC ....... *G06Q 20/065* (2013.01); *G06Q 20/0658* (2013.01); *G06Q 20/36* (2013.01); *G06Q 20/389* (2013.01); *G06Q 20/3829* (2013.01); *H04L 9/0637* (2013.01); *H04L 9/0643* (2013.01); *H04L 9/0861* (2013.01); *H04L 9/3247* (2013.01); *H04L 9/3263* (2013.01); *H04W 4/70* (2018.02); *H04L 9/50* (2022.05); *H04L 2209/56* (2013.01)

(58) Field of Classification Search
CPC ..... H04L 2209/56; H04L 9/06; G06F 21/305; G06F 21/645; G06Q 20/065; G06Q 20/0658; G06Q 20/36; G06Q 20/3829; G06Q 20/389; G06Q 2220/00; G06Q 10/06; G06Q 20/3678; G06Q 20/3827; G06Q 20/3825; H04W 4/70
See application file for complete search history.

(56) References Cited

U.S. PATENT DOCUMENTS

| | | | | |
|---|---|---|---|---|
| 2012/0278612 | A1* | 11/2012 | Ferri | G06F 21/51 713/155 |
| 2013/0246261 | A1* | 9/2013 | Purves | G06Q 20/36 705/41 |
| 2015/0026049 | A1* | 1/2015 | Theurer | G06Q 20/36 705/41 |
| 2015/0220914 | A1* | 8/2015 | Purves | G06Q 30/0633 705/41 |
| 2016/0085955 | A1* | 3/2016 | Lerner | H04L 9/0869 726/20 |
| 2016/0292680 | A1* | 10/2016 | Wilson, Jr. | G06Q 40/06 |
| 2017/0005804 | A1* | 1/2017 | Zinder | G06F 21/6254 |
| 2017/0091756 | A1* | 3/2017 | Stern | G06Q 40/06 |
| 2017/0116693 | A1* | 4/2017 | Rae | G06Q 50/184 |
| 2017/0187535 | A1* | 6/2017 | Middleton | H04L 9/3247 |
| 2017/0221052 | A1* | 8/2017 | Sheng | H04L 9/3242 |
| 2017/0230189 | A1* | 8/2017 | Toll | H04L 9/0618 |
| 2017/0232300 | A1* | 8/2017 | Tran | A63B 71/06 434/247 |
| 2017/0316390 | A1* | 11/2017 | Smith | H04L 9/0637 |
| 2017/0330174 | A1* | 11/2017 | Demarinis | G06Q 40/04 |
| 2018/0078843 | A1* | 3/2018 | Tran | G09B 19/0038 |
| 2018/0117446 | A1* | 5/2018 | Tran | A42B 3/0433 |
| 2018/0139057 | A1* | 5/2018 | Truu | H04L 9/3242 |
| 2018/0144114 | A1* | 5/2018 | Fiske | G06F 21/32 |
| 2018/0191503 | A1* | 7/2018 | Alwar | H04L 9/14 |
| 2018/0264347 | A1* | 9/2018 | Tran | A63B 43/004 |
| 2019/0019183 | A1* | 1/2019 | Karame | H04L 9/0637 |
| 2019/0188701 | A1* | 6/2019 | Parsons | H04L 9/14 |
| 2019/0295054 | A1* | 9/2019 | Purves | G06Q 20/28 |
| 2020/0204338 | A1* | 6/2020 | Bougalis | H04L 9/3239 |
| 2020/0302409 | A1* | 9/2020 | Hearn | G06Q 20/389 |

* cited by examiner

| Sample NOR Gate Transaction | |
|---|---|
| NOR-T1 | Transaction-ID |
| Version Number | Version number |
| 1 | Number of inputs |
| <Controller's BTC store, assume 100,000 satoshi> | Prev Trans Output |
| IDX-00 | Prev Trans Output index |
| Script length | Script length |
| Sig-Controller PubK-Controller | ScriptSig |
| Sequence number | Sequence number |
| 2 | Number of Outputs |
| 1,000 | Output value |
| Output Script Length | Output script length |
| OP_HASH160 <Redeem Script Hash> OP_EQUAL | Output script |
| 98,000 | Output value |
| Output Script Length | Output script length |
| OP_DUP OP_HASH160 <PubK-Controller> OP_EQUALVERIFY OP_CHECKSIG | Output script |
| LockTime | LockTime |

Fig. 4

```
OP_DUP                              OP_TOALTSTACK           OP_TOALTSTACK
OP_DUP                              OP_TOALTSTACK           OP_TOALTSTACK
~<PubK-Controller>~                 ~OP_CHECKSIGVERIFY~
*OP_DUP*                            *<PubK-Control-True>*   *OP_CHECKSIG*
*OP_SWAP*                           *<PubK-Control-False>*  *OP_CHECKSIG*
*OP_SWAP*                           *OP_DUP*                *OP_TOALTSTACK*
*OP_NOT*                            *OP_EQUALVERIFY*        *OP_FROMALTSTACK*
OP_FROMALTSTACK                     <PubK-A-True>           OP_CHECKSIG
OP_FROMALTSTACK                     <PubK-A-False>          OP_CHECKSIG
OP_FROMALTSTACK                     <PubK-B-True>           OP_CHECKSIG
OP_FROMALTSTACK                     <PubK-B-False>          OP_SWAP
OP_DUP                              OP_TOALTSTACK           OP_NUMNOTEQUAL
OP_DUP                              OP_TOALTSTACK
OP_VERIFY
OP_DUP                              OP_TOALTSTACK           OP_SWAP
OP_DUP                              OP_TOALTSTACK           OP_NUMNOTEQUAL
OP_VERIFY
OP_FROMALTSTACK                     OP_FROMALTSTACK         OP_FROMALTSTACK
OP_SWAP                             OP_FROMALTSTACK
OP_EQUAL                            OP_TOALTSTACK           OP_DROP
OP_DROP                             OP_FROMALTSTACK
*OP_EQUAL*
```

FIG. 13

BLOCKCHAIN-IMPLEMENTED METHOD AND SYSTEM

CROSS-REFERENCE TO RELATED APPLICATIONS

This application is a continuation of U.S. patent application Ser. No. 16/320,080, filed Jan. 23, 2019, entitled "BLOCKCHAIN-IMPLEMENTED METHOD AND SYSTEM," which is a 371 Nationalization Patent Application of International Patent Application No. PCT/IB2017/054422, filed Jul. 21, 2017, entitled "BLOCKCHAIN-IMPLEMENTED METHOD AND SYSTEM," which claims priority to United Kingdom Patent Application No. 1613177.3, filed Jul. 29, 2016, entitled "COMPUTER-IMPLEMENTED METHOD AND SYSTEM," and United Kingdom Patent Application No. 1613148.4, filed Jul. 29, 2016, entitled "COMPUTER-IMPLEMENTED METHOD AND SYSTEM," and United Kingdom Patent Application No. 1613188.0, filed Jul. 29, 2016, entitled "COMPUTER-IMPLEMENTED METHOD AND SYSTEM," the disclosures of which are incorporated herein by reference in their entirety.

This invention relates generally to distributed ledger technology (including blockchain related technologies), and in particular the use of a blockchain in implementing, controlling and/or automating a task or process. It may relate to the use of a blockchain or related technology for recording or representing the execution of a portion of logic. This portion of logic may be arranged to implement the functionality of a logic gate, or plurality of logic gates, such as AND, XOR, NOT, OR etc.

It is important to note that in this document we use the term 'blockchain' for the sake of convenience and ease of reference because it is currently the most widely known term in this context. However, the term is used herein (including in the claims) to include all forms of consensus-based, electronic, computer-based distributed ledgers, including, but not limited to blockchain and transaction-chain technologies, permissioned and un-permissioned ledgers, shared ledgers and variations thereof.

A blockchain is an electronic ledger which is implemented as a computer-based decentralised, distributed system made up of blocks which in turn are made up of transactions. Each transaction includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain.

The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations fall within the scope of the invention.

Blockchain technology is most widely known for the use of cryptocurrency implementation. However, in more recent times, digital entrepreneurs have begun exploring both the use of the cryptographic security system Bitcoin is based on, and the data that can be stored on the Blockchain, to implement new systems. It would be highly advantageous if the blockchain could be used for tasks and processes, such as automated control processes, which are not limited to the realm of cryptocurrency. Such solutions would be able to harness the benefits of the blockchain (e.g. a permanent, tamper proof records of events, distributed processing etc) while being more versatile in their applications.

Such an improved solution has now been devised. Thus, in accordance with the present invention there is provided a system and method as defined in the appended claims.

Therefore, in accordance with the invention there may be provided a computer-implemented method. It may be described as a control method. It may control or influence the performance of a technical process or the operation of one or more devices. Additionally or alternatively, it may control the execution of a blockchain script. It may control whether or not an output in a blockchain transaction is unlocked. It may control whether or not a portion of cryptocurrency is transferred from one party to another via a blockchain.

The method may comprise the step of providing a blockchain Transaction (Tx) comprising a redeem script for an output, wherein the redeem script:

specifies a plurality of public keys. These may be cryptographic keys. They may form part of a private/public key pair. Each of the keys in the plurality (or "list") may be associated with a corresponding private key. Each public key may be uniquely associated with a potential state of at least one data source. Thus, the redeem script may include a list of public keys, wherein only the corresponding private keys for those public keys may be used to spend the transaction output (TxO).

The method may comprise the step of generating the transaction. It may comprise the step of submitting it to a blockchain.

The transaction and/or further (spending) transaction may be generated by a computing agent. It may be generated autonomously (without human intervention) based upon input(s) received from a sensor or other signal source.

Additionally or alternatively, the redeem script may comprise a portion of logic arranged to provide a result based on which of the plurality of associated private key(s) is used to sign the unlocking script. Thus, the execution of the logic provided in the redeem script may be determined by which public keys were used to sign the unlocking script.

Advantageously, this provides a greater degree of control than prior art techniques which simply require that a certain number of keys are used, rather than which particular keys are used. By determining which particular keys from the plurality are used, the invention provides an alternative, enhanced security technique which facilitates a greater degree of granularity or sophistication when controlling the locking/unlocking a transaction output UTXO. Thus, it can be said that the invention provides an improved cryptographic technique for controlling the transfer of a portion of cryptocurrency.

Additionally or alternatively, a minimum number of said private keys may be required to sign an unlocking script of a further blockchain Transaction in order to spend the output.

The result or outcome provided by the logic may be dependent upon a determination of which (particular) private key(s) were used to sign the unlocking script. The method may comprise the step of matching the private key(s) which were used to sign the unlocking script against the associated public keys provided within the redeem script.

The logic in the redeem script may be arranged to implement the functionality of a logic gate. The logic gate may be a NOT, AND, OR, NOR, XOR, IMPLY, NAND, NONIMPLY and/or a XNOR gate. Thus, the invention may be described as providing a technique which enables the functionality of a logic gate to be simulated or put into effect via a blockchain transaction.

The state of the at least one data source may be determined by a computing agent. The agent may be arranged to monitor a condition. This may be, for example, a condition on a computing network or a device-related condition, or the condition of an environmental factor, or any other type of quantifiable condition.

The computing agent may be in communication which a control computing agent. This may be referred to herein as a "controller". The redeem script may be generated by the controller. One or more agents may be arranged to control a process or apparatus.

One, some or all of the computing agents may comprise a cryptographic key, which may be called an agent base key. This may be generated by the agent(s). It may be derived and/or received from a controller. One or more of the plurality of keys may be generated or derived from a base or "master" key. The key generation may be a performed using a deterministic key generation technique. The method may comprise the step of generating or deriving a further or separate key for each possible state of a condition which is being monitored by the agent. The further key may be derived from the base key using the technique described below in the section entitled "Creating a Key Using a shared Secret".

The result provided by the logic may be a Boolean result or some other type of result. The logic may provide a result from a restricted range of results.

There may be at least two data sources. There may be two potential states for, or associated with, each data source. Each potential state may be associated with, or represented by, a public key. Thus, the list of public keys provided in the redeem script may be used to define, represent or describe all possible states that the data sources(s) may adopt or enter.

The method may comprise the step:
for each of the at least one data sources:
associating a public key in the plurality with a potential state of the data source;
such that all possible states of the data sources are represented by a respective public key.

In other words, each possible state of each data source may be associated with a public key such that the public key can be used as a (unique) identifier for that state. Thus, the keys may be deliberately selected so as to form a mapping between each key and a potential state of the data source. This may enable the keys to function as representations of the potential states of the data source. Analysis or determination of which private keys are used to sign during the unlocking process may then enable a determination of the state of the data source.

The at least one data source may comprise a sensor. Additionally or alternatively, the data source may comprise a source which is capable of generating and/or transmitting an input signal to a computing resource or agent.

Each public key may represent a Boolean value indicative of a potential state of the at least one data source. For example, is a signal received or not received, or is the temperature above 20 degrees C.?

The invention also provides a corresponding system. The system may be arranged to implement any embodiment of the method described above.

The invention may provide a computer-implemented system comprising:
at least one computer-based resource arranged to perform the step(s) of any method described above; and
a blockchain or other type of electronic ledger, or variation of the Bitcoin ledger.

This may be a distributed ledger.

The at least one computer based resource may be arranged to:
submit a transaction to a blockchain network (this may or may not be the Bitcoin network—it may be any type of distributed ledger); and/or
generate a transaction; and/or
digitally sign a locking script; and/or
generate a public/private cryptographic key.

The system may be arranged such that the result is used to control or influence the execution or operation of a process or apparatus. The computer-based resource may be referred to as an "agent."

The system may comprise at least one sensor or other signal generation component arranged/configured to provide an input to the at least one computer based resource.

Any feature described in relation to one aspect or embodiment of the invention may also be used to effect with one or more other aspects/embodiments. Any feature described in respect of the method may be applied to the system and vice versa.

These and other aspects of the present invention will be apparent from and elucidated with reference to, the embodiment described herein. An embodiment of the present invention will now be described, by way of example only, and with reference to the accompany drawings, in which:

FIG. 4 shows an example Blockchain transaction arranged in accordance with an embodiment of the invention, and in which transaction output 1 implements the NOR gate with transaction output 2 paying change back to the Controller.

FIGS. 11 to 14 show example redeem scripts.

Figure 1:
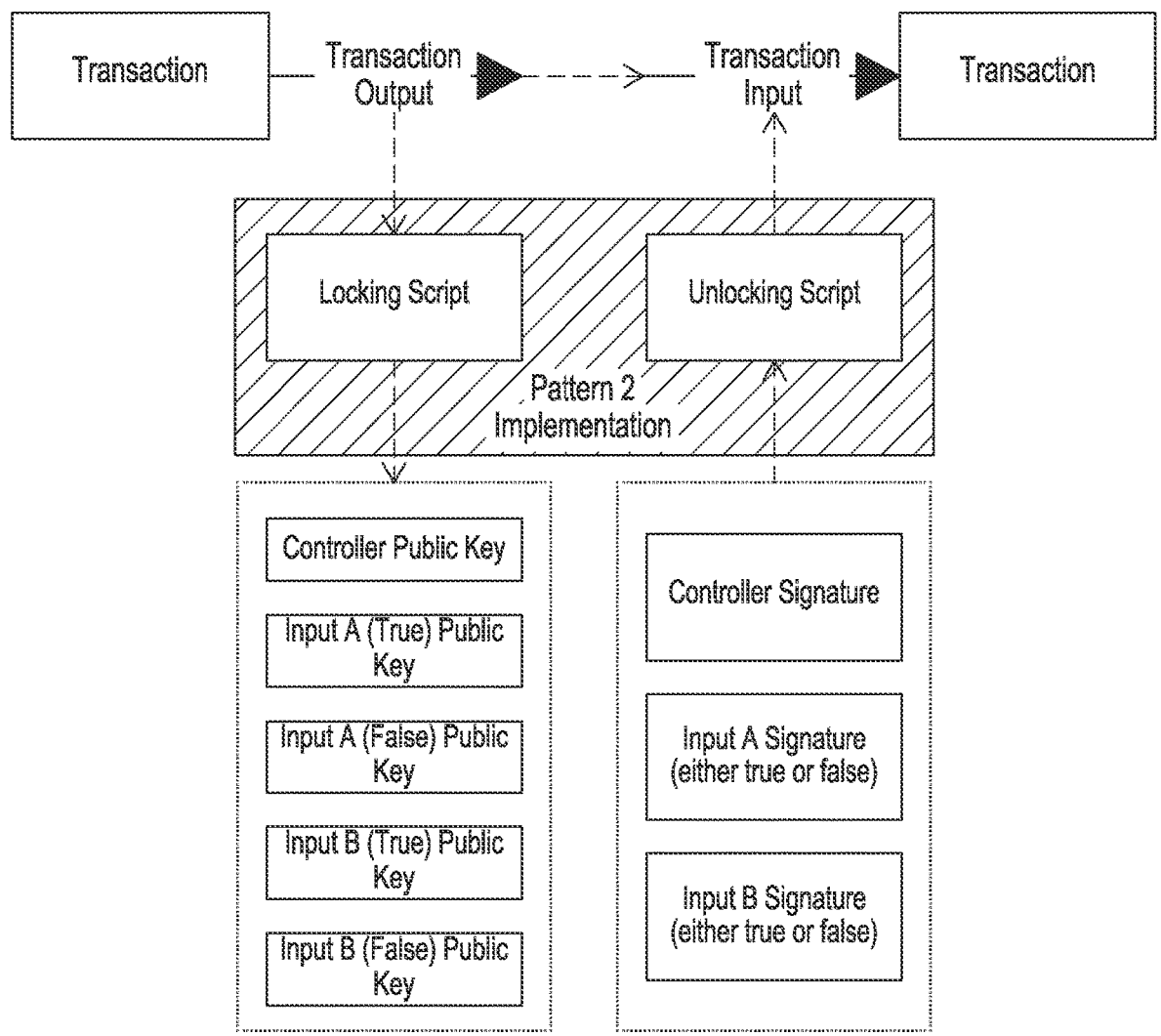
FIG. 1 shows an illustration of an embodiment of the invention.

The invention provides a novel and advantageous solution for using a blockchain to implement a function. The blockchain is used to provide a record of the execution of the function and/or a result of its result. A function can be a subroutine or procedure (i.e. a process or portion of logic) which is applied to a set of inputs and returns a set of outputs. In one possible embodiment, the function can be executed 'off-block' i.e., its performance is not blockchain-dependent. The function is performed by a computer-based resource.

A blockchain (e.g. Bitcoin) transaction is a transfer of (e.g. Bitcoin) value which typically references previous transaction outputs as new transaction inputs and dedicates all input values to new outputs. Transactions are not encrypted, so it is possible to browse and view every transaction ever collected into a block. It would be highly advantageous, however, to be able to construct a blockchain transaction which acts as a function, where the transaction output(s) are conditional or dependent on information supplied. This would enable a sophisticated level of behaviour via a blockchain.

Important aspects of the present invention include (but are not limited to) a method for creating a blockchain transaction that represents a function where function input(s) are represented by the public keys used within a redeem script of the transaction's output and wherein actual values are represented by signatures associated with one or more of the public keys.

The invention will be illustrated via use case examples provided below, in which blockchain (e.g. Bitcoin) transactions can be used to represent the functionality provided by a logic gate.

This functionality can then be used to control some technical process or apparatus.

This invention provides a number of novel features above the Blockchain, including:

The ability to create agents against sensors or other types of signal/input generators where the agent is controlled directly from the Blockchain and requires no other network access in order to operate;

The ability to determine, on a transaction secured by multiple signatures, which public keys were involved in the transaction signing process; and The ability to embed a limited, discrete, range of payload values within the signing keys that can be used to determine behaviour (i.e. how code executes) within the redeem script.

In addition, embodiments of the invention can make use of the above elements to deliver a logic gate (e.g. NOR gate) where the input values from A and B are embedded within, or represented by, the key used for signing.

Benefits

The proposed invention offers the following benefits:

inherently secure by design (the Bitcoin protocol requires no trusted parties);

distributed, so avoids a large single point of failure and is not vulnerable to attack;

easy to manage and maintain, the Bitcoin network is straightforward to use;

inexpensive (just a small transaction fee is usually expected under the Bitcoin protocol);

global and can be used at any time by anyone with access to the Internet;

transparency: once data has been written to the blockchain, anyone can see it;

immutable, once data has been written to the blockchain, no one can change it; and privacy is maintained, no personally identifying information is involved.

In order for the invention to operate, it must conform to the existing constructs and behaviours of the Bitcoin protocol and wallets. FIG. 1 shows how a standard Bitcoin transaction (TX) is constructed in accordance with an embodiment of the invention. (bitcoin is used for illustration only, and other ledgers and associated protocols may be used while still falling within the scope of the invention).

Agent Configuration

Figure 2:
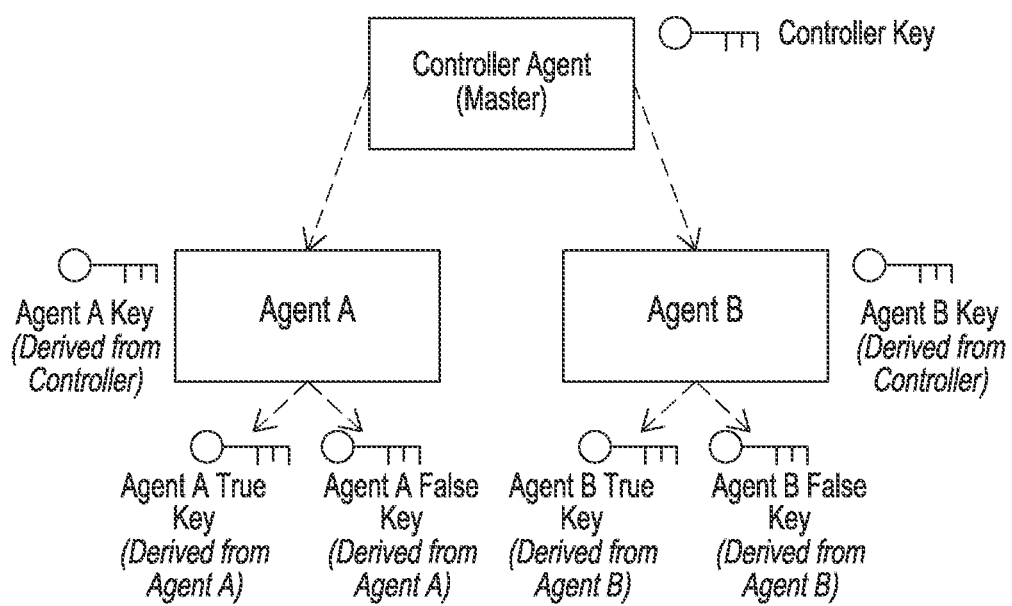
FIG. 2 shows an illustrative embodiment of the invention in which a plurality of independent computing agents perform the monitoring of the external environments to provide inputs into the logic gate transaction.

An embodiment of the invention comprises the use of a number of independent (computing) agents that are arranged to perform the monitoring of external environments to provide inputs into this logic gate transaction, as shown in FIG. 2. Thus, the computing agents are designed to monitor some condition. An input may be received from a sensor for this purpose. For example, the agent may monitor a condition such as "is the temperature below zero degrees Celsius?" or any other type of testable condition. The agent may be arranged, therefore, to monitor the state of its observed condition.

The agents are in communication with a control or master agent, hereafter referred to as a "controller." The Controller is arranged to for operation with the blockchain protocol.

In one or more embodiments, the subordinate agents (e.g., A and B) may comprise keys which are derived from the controller. However, it should be noted that it is possible for Agent A and Agent B to have self-generated keys and not derive these from the Controller. This restricts the functionality that the Controller can use on the keys.

In one or more embodiments, each condition being monitored has a separate monitoring agent set-up with their own key. From this key, they derive a separate key for the output from their monitoring condition (i.e. for each possible state). These values are deterministically derivable from their base key, which could be done at the point of monitoring or the agent could pre-derive the values (for example, it may be more efficient for a true/false sensor to simply pre-define). The key may be derived from the base key using the technique described below in the section entitled "Creating a Key Using a shared Secret."

Agent Behaviour

The embodiment described above allows Agents to have a very tightly defined behaviour; at their base point they are sensors that are detecting a single condition and responding on demand to that condition. The following table demonstrates the behaviour pattern for these agents.

| Step | Description |
| --- | --- |
| 1 | Startup agent, and derive new key from start-up parameters. |
| 2 | Wait for transaction signing request. |
| 3 | On receipt of transaction signing request, get data from attached sensor |
| 4 | Using data from attached sensor, derive new signing key |
| 5 | Sign transaction request |
| 6 | Go to step 2 |

Note that step 2 is the standard process to implement multi-signature transactions as known in the prior art. An inventive step can be seen in Steps 3 and 4 which allow the agent to embed the sensor value in the signature returned from the Agent.

Data Value Extraction & Transaction Evaluation

The redeem script in the transaction then allows the effective de-facto extraction of the values embedded by the autonomous agents. However, this only works where the range of possible values is known in advance; the examples herein are where Agents A and B provide 'true'/'false' values but a broader range of values is also possible using this method (e.g. 1, 2, 3, 4, 5). The point is that a unique key is used to represent each possible value or state, so that the redeem script can determine what the value is based on which key was used to sign the unlocking script. However, as the logic provided within the redeem script must be arranged to perform this analysis, the method does not support an infinite range of possible values.

The method works by evaluating the signatures supplied by the agent against the possible derived public keys for that agent. So, when the redeem script was first constructed by the Controller, it would have determined what the public key for each possible input value (state) was and included these within the payload of the redeem script.

In order for the script to extract this data, it does so by determining which of the public keys was used to sign the transaction and since the script has been coded to implicitly understand the value that this public key represents, it has effectively extracted that value for the purpose of utilisation within the confines of the script.

Within the known Blockchain standard, the built-in OP_CHECKMULTISIG transaction function allows the evaluation of signatures in order to determine that enough signatures were collected via the unlocking script. However, this does not allow the explicit determination of which were used. Therefore, the invention provides an improvement over the prior art because it presents a technique for using a Tx to explicitly match against particular keys to determine which were used, and therefore allows much more complexity to be implemented via transactions. In other words, by determining which subset of the plurality of keys is used in the signing process, it is possible to produce a more sophisticated behaviour via the blockchain.

For example, in an escrow function it is possible to effectively create an escrow with multiple escrow agents but define a scripting rule that requires the provision of a signature of the buyer plus the seller, or the buyer plus one of the escrow agents or the seller plus one of the escrow agents. This is not possible in the known standard Bitcoin protocol since the standard construct would allow both of the escrow agents to sign the transaction.

Redeem Script Pseudo Code

In accordance with an embodiment of the invention, logic within the redeem script may be arranged as follows:

```
IF Validate(sig-Controller,pubK-Controller) =TRUE THEN
   SET Variable-A = INDETERMINED
   SET Variable-B = INDETERMINED
   IF Validate(sig-A,PubK-A-true) =TRUE THEN
      SET Variable-A=TRUE
   ELSE IF Validate(sig-A,PubK-A-false) =TRUE THEN
      IF Variable-A=TRUE THEN
         Return FALSE   // A is both true and false which is
            rubbish
      ELSE
         SET Variable-A=FALSE
   IF Validate(sig-B,PubK-B-True) =TRUE THEN
      SET Variable-B=TRUE
   ELSE IF Validate(sig-B,PubK-B-False) =TRUE THEN
      IF Variable-B=TRUE THEN
         Return FALSE   // B is both true and false which is
            rubbish
      ELSE
         SET Variable-B=FALSE
   IF Variable-A = INDETERMINED OR Variable-B =
   INDETERMINED THEN
      Return FALSE
   ELSE
      RETURN Variable-A NOR Variable-B
ELSE
   RETURN FALSE
```

Example Transaction

In an example transaction, transaction output (TxO) 1 implements a NOR gate with transaction output 2 paying change back to the Controller. The Transaction is shown in FIG. 4.

Redeem Script

Figure 11:
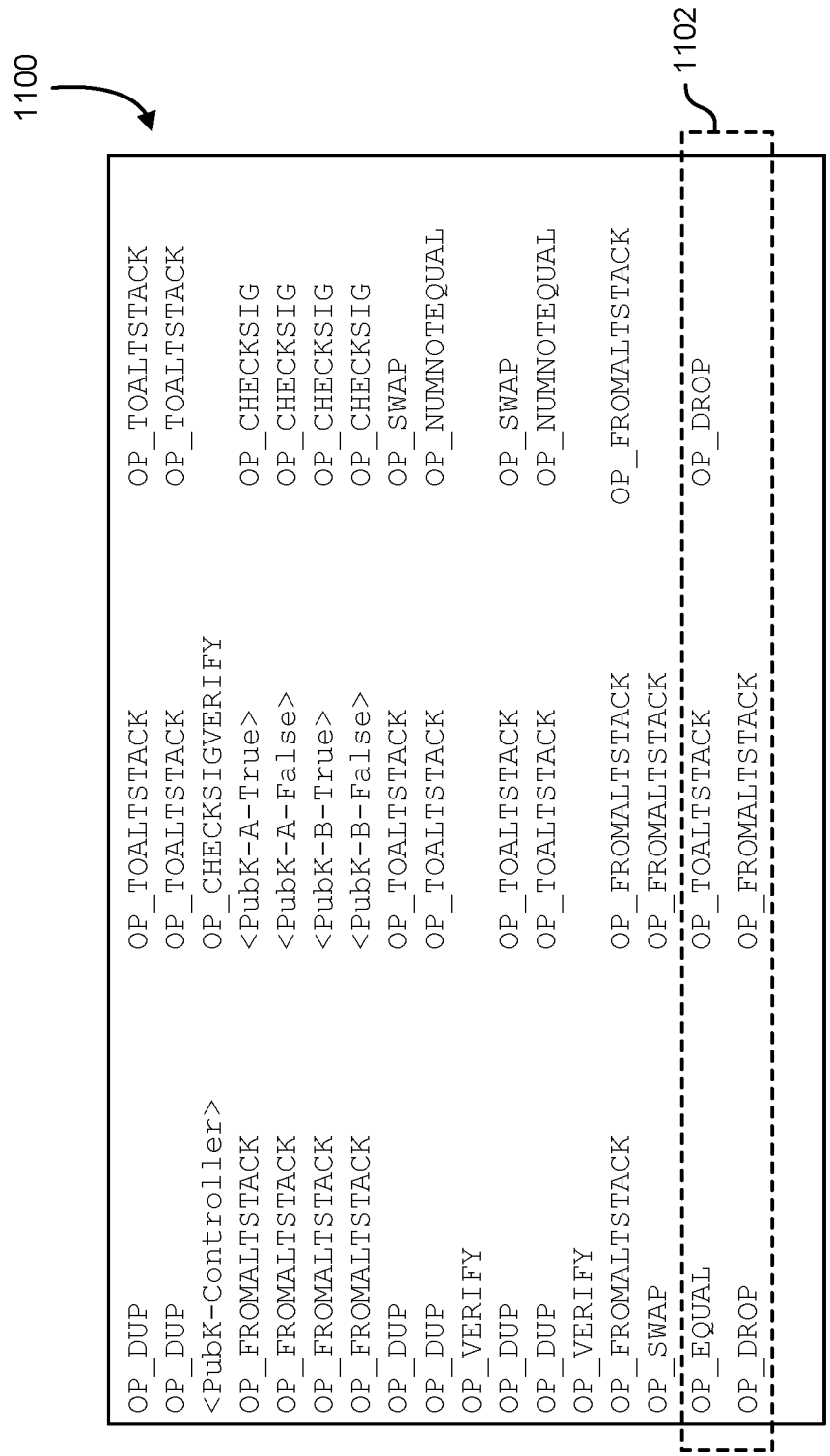

The full redeem script 1100 is shown in FIG. 11. This is then broken down into logical components.

The instruction codes within the box 1102 demonstrate the NOR gate payload code (block 7 below) which are provided above the signature manipulation logic required to bring the data into a format which can be validated.

In order to partition into logical 'sub-functions' the script is broken down into a sequence of blocks as shown in the following table for the convenience of the reader.

| Name | Script | Block Purpose |
|---|---|---|
| RS Block 1 | OP_DUP<br>OP_TOALTSTACK<br>OP_TOALTSTACK<br>OP_DUP<br>OP_TOALTSTACK<br>OP_TOALTSTACK<br>\<PubK-Controller><br>OP_CHECKSIGVERIFY<br>\<RS Block 2> | This pushes the data bearing signatures across onto the alternative stack, before confirming that the controller authorised the transaction. |
| RS Block 2 | OP_FROMALTSTACK<br>\<PubK-A-True><br>OP_CHECKSIG<br>OP_FROMALTSTACK<br>\<PubK-A-False><br>OP_CHECKSIG<br>\<RS Block 3> | This block evaluates which of the A public keys has been used to sign this transaction. The script does not care (at this point) whether any signatures have been used or not. |
| RS Block 3 | OP_FROMALTSTACK<br>\<PubK-B-True><br>OP_CHECKSIG<br>OP_FROMALTSTACK<br>\<PubK-B-False><br>OP_CHECKSIG<br>\<RS Block 4> | This block evaluates whether, and which, of the two B public keys has been used to sign the transaction. The script does not care (at this point) whether any signatures have been used or not. |

| Name | Script | Block Purpose |
|---|---|---|
| RS Block 4 | OP_DUP<br>OP_TOALTSTACK<br>OP_SWAP<br>OP_DUP<br>OP_TOALTSTACK<br>OP_NUMNOTEQUAL<br>OP_VERIFY<br><RS Block 5> | This block of code checks to make sure that: One, and only one, of the A public keys was used to sign the transaction. |
| RS Block 5 | OP_DUP<br>OP_TOALTSTACK<br>OP_SWAP<br>OP_DUP<br>OP_TOALTSTACK<br>OP_NUMNOTEQUAL<br>OP_VERIFY<br><RS Block 6> | This block of code checks to make sure that: One, and only one, of the B public keys was used to sign the transaction. |
| RS Block 6 | OP_FROMALTSTACK<br>OP_FROMALTSTACK<br>OP_FROMALTSTACK<br>OP_SWAP<br>OP_FROMALTSTACK<br><RS Block 7> | This block brings back the validated key information from the alternative stack and aligns the signals. |
| RS Block 7 (NOR) | OP_EQUAL<br>OP_TOALTSTACK<br>OP_DROP<br>OP_DROP<br>OP_FROMALTSTACK | This block implements the NOR logic within the script. Note that it can take some shortcuts as it knows that either:<br><B-False-Result> is true OR <B-True-Result> is true but they can't both have the same value;<br><A-False-Result> is true OR <A-True-Result> is true, but they can't both have the same value. |

Locking Script

The locking script is a standard Pay-to-Script-Hash model:

OP_HASH160<Redeem Script Hash> OP_EQUAL

Unlocking Script

The required unlocking script is:

<Sig-Controller><Sig-A-Used><Sig-B-Used><RS Block 1>

Where:

<Sig-A-Used> is either:
  <Sig-A-True>; or
  <Sig-A-False>
<Sig-B-Used> is either:
  <Sig-B-True>; or
  <Sig-B-False>

Illustration: NOR Logic Gate

The NOR gate is a logic gate that implements a NOT OR. That is, if both inputs are false, then the output will be true, otherwise the output will be false.

| A | B | X |
|---|---|---|
| 0 | 0 | 1 |
| 0 | 1 | 0 |
| 1 | 0 | 0 |
| 1 | 1 | 0 |

The NOR logic is implemented within a single Bitcoin transaction output which requires a controller signature, plus a signature from the A agent representing either the true or false value, and another signature from the B agent (again either true or false). FIG. 1 shows an overview of how this NOR method can be implemented via the Bitcoin protocol.

It is possible to implement alternative gates, by replacing RB Block 7 as shown in the subsequent sections.

AND Gate

| A | B | X |
|---|---|---|
| 0 | 0 | 0 |
| 0 | 1 | 0 |
| 1 | 0 | 0 |
| 1 | 1 | 1 |

| Name | Script | Block Purpose |
|---|---|---|
| RS Block 7 (AND) | OP_DROP<br>OP_DROP<br>OP_1<br>OP_EQUAL<br>OP_EQUAL | This block implements the AND logic within the script. Note that it can take some shortcuts as it knows that either:<br><B-False-Result> is true OR <B-True-Result> is true but they can't both have the same value;<br><A-False-Result> is true OR <A-True-Result> is true, but they can't both have the same value. |

NAND Gate

| A | B | X |
|---|---|---|
| 0 | 0 | 1 |
| 0 | 1 | 1 |
| 1 | 0 | 1 |
| 1 | 1 | 0 |

| Name | Script | Block Purpose |
|---|---|---|
| RS Block 7 (NAND) | OP_1<br>OP_EQUAL<br>OP_EQUAL<br>OP_TOALTSTACK<br>OP_DROP<br>OP_DROP<br>OP_FROMALTSTACK | This block implements the NAND logic within the script. Note that it can take some shortcuts as it knows that either:<br><B-False-Result> is true OR <B-True-Result> is true but they can't both have the same value;<br><A-False-Result> is true OR <A-True-Result> is true, but they can't both have the same value. |

OR Gate

| A | B | X |
|---|---|---|
| 0 | 0 | 0 |
| 0 | 1 | 1 |
| 1 | 0 | 1 |
| 1 | 1 | 1 |

| Name | Script | Block Purpose |
|---|---|---|
| RS Block 7 (OR) | OP_TOALTSTACK<br>OP_0<br>OP_EQUAL<br>OP_FROMALTSTACK<br>OP_0<br>OP_EQUAL<br>OP_EQUAL<br>OP_NOT<br>OP_TOALTSTACK<br>OP_DROP<br>OP_DROP<br>OP_FROMALTSTACK | This block implements the OR logic within the script. Note that it can take some shortcuts as it knows that either:<br><B-False-Result> is true OR <B-True-Result> is true but they can't both have the same value;<br><A-False-Result> is true OR <A-True-Result> is true, but they can't both have the same value. |

XOR Gate

| A | B | X |
|---|---|---|
| 0 | 0 | 0 |
| 0 | 1 | 1 |
| 1 | 0 | 1 |
| 1 | 1 | 0 |

| Name | Script | Block Purpose |
|---|---|---|
| RS Block 7 (XOR) | OP_1<br>OP_EQUAL<br>OP_EQUAL<br>OP_NOT | This block implements the XOR logic within the script. Note that it can take some shortcuts as it knows that either:<br><B-False-Result> is true OR <B-True-Result> is true but they can't both have the same value;<br><A-False-Result> is true OR <A-True-Result> is true, but they can't both have the same value. |

XNOR Gate

| A | B | X |
|---|---|---|
| 0 | 0 | 1 |
| 0 | 1 | 0 |
| 1 | 0 | 0 |
| 1 | 1 | 1 |

-continued

| Name | Script | Block Purpose |
|---|---|---|
| RS Block 7 (XNOR) | OP_1 OP_EQUAL OP_EQUAL | This block implements the XNOR logic within the script. Note that it can take some shortcuts as it knows that either: <B-False-Result> is true OR <B-True-Result> is true but they can't both have the same value; <A-False-Result> is true OR <A-True-Result> is true, but they can't both have the same value. |

NOT Gate

The implementation of this gate is slightly more complicated since it only has a single input.

| A | X |
|---|---|
| 0 | 1 |
| 1 | 0 |

As a result, the Unlocking Script changes to, deletions are shown ~between tildes~ below:
    <Sig-Controller><Sig-A-Used>~<Sig-B-Used>~<RS Block 1>

As a result of a single input, the following block changes occur:

| Name | Script | Block Purpose |
|---|---|---|
| RS Block 1 | OP_DUP<br>OP_TOALTSTACK<br>OP_TOALTSTACK<br>~OP_DUP~<br>~OP_TOALTSTACK~<br>~OP_TOALTSTACK~<br><PubK-Controller><br>OP_CHECKSIGVERIFY<br><RS Block 2> | This pushes the data bearing signatures across onto the alternative stack, before confirming that the controller authorised the transaction. |
| RS Block 2 | OP_FROMALTSTACK<br><PubK-A-True><br>OP_CHECKSIG<br>OP_FROMALTSTACK<br><PubK-A-False><br>OP_CHECKSIG<br><RS Block 4> | This block evaluates which of the A public keys has been used to sign this transaction. The script does not care (at this point) whether any signatures have been used or not. |
| RS Block 3 | ~OP_FROMALTSTACK~<br>~<PubK-B-True>~<br>~OP_CHECKSIG~<br>~OP_FROMALTSTACK~<br>~<PubK-B-False>~<br>~OP_CHECKSIG~<br>~<RS Block 4>~ | Entire block removed |
| RS Block 4 | OP_DUP<br>OP_TOALTSTACK<br>OP_SWAP<br>OP_DUP<br>OP_TOALTSTACK<br>OP_NUMNOTEQUAL<br>OP_VERIFY<br><RS Block 6> | This block of code checks to make sure that: One, and only one, of the A public keys was used to sign the transaction. |
| RS Block 5 | ~OP_DUP~<br>~OP_TOALTSTACK~<br>~OP_SWAP~<br>~OP_DUP~<br>~OP_TOALTSTACK~<br>~OP_EQUALVERIFY~<br>~<RS Block 6>~ | Entire block removed |

| Name | Script | Block Purpose |
|---|---|---|
| RS Block 6 | OP_FROMALTSTACK<br>OP_FROMALTSTACK<br>~OP_FROMALTSTACK~<br>~OP_SWAP~<br>~OP_FROMALTSTACK~<br><RS Block 7> | This block brings back the validated key information from the alternative stack and aligns the signals. |
| RS Block 7 (NOT) | OP_NOT | This block implements tire NOT logic within the script. |

A number of varying embodiments may be provided, as described below.

Variant 1: Generating a TRUE & FALSE SIGNAL

The above description allows the unsigned transaction output (UTXO) representing the logic gate to be spent only where the gate conditions evaluate to TRUE. In a number of situations, it would be advantageous to spend the output (albeit to different recipient addresses) regardless of the actual output of the circuit.

Figure 3:
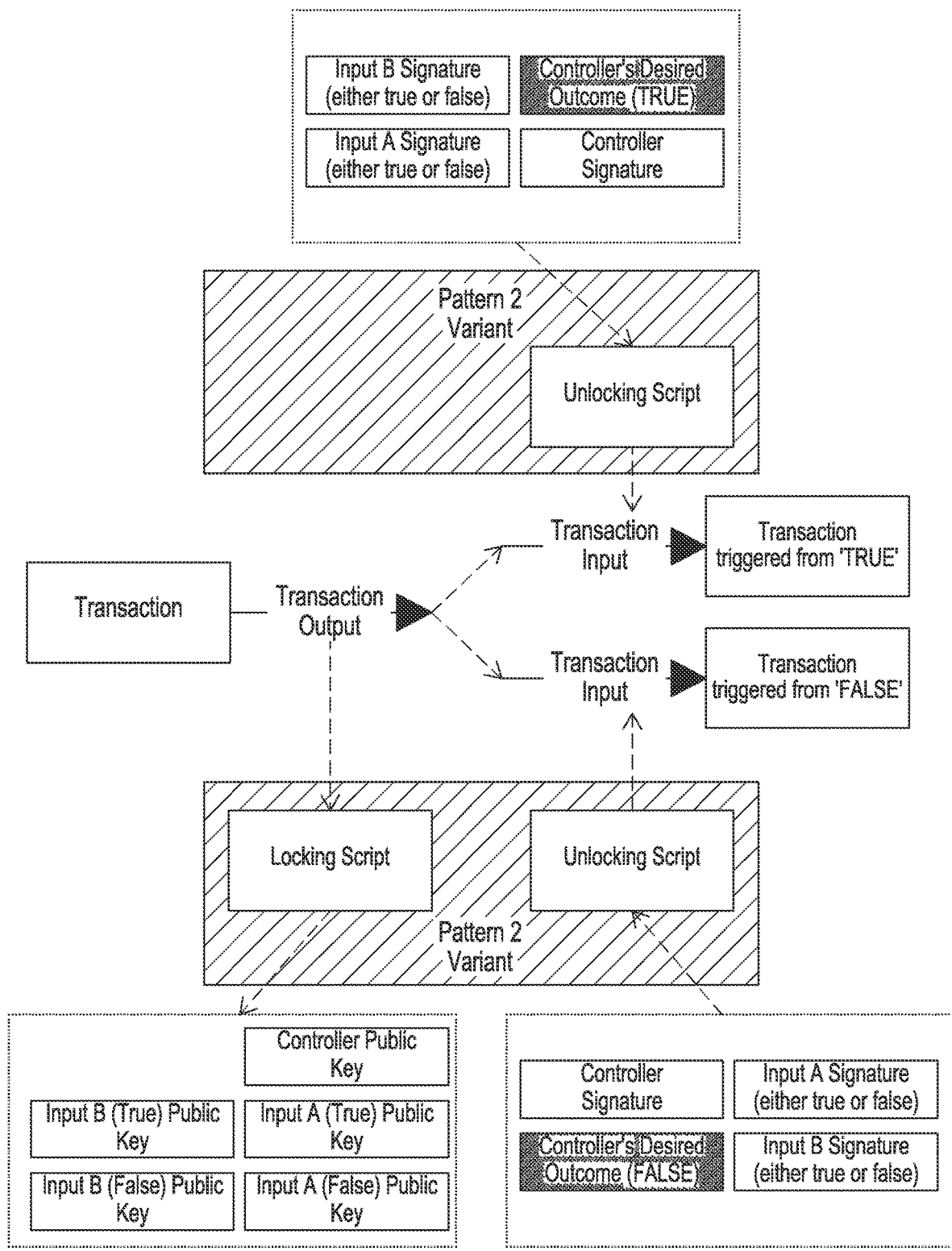
FIG. 3 shows an overview of another embodiment of the invention.

This is possible using this Embodiment. Effectively the embodiment shown in FIG. 1 is amended as shown in the FIG. 3. In this scenario, there is an extra parameter supplied to the redeem script which can be either a puzzle, or embedded in a key or supplied explicitly (as it is in the example). This defines the Controller's desired outcome to spend the UTXO.

Therefore, for a simple logic gate, the Controller would attempt to spend the transaction twice using the same signatures; one with an expected TRUE outcome and once with an expected FALSE outcome.

The redeem script will be expanded such that at the end of the gate calculation it applies an equality check on the output of the gate to the output requested by the Controller, such that:

If the embedded gate logic returns FALSE, and the desired outcome is FALSE, then the redeem script will evaluate to TRUE and the UTXO can be spent;

If the embedded gate logic returns TRUE, and the desired outcome is TRUE, then the redeem script will evaluate to TRUE and the UTXO can be spent;

If the embedded gate logic returns TRUE, but the desired outcome is FALSE, then the redeem script will evaluate to FALSE and the UTXO cannot be spent; and If the embedded gate logic returns FALSE, but the desired outcome is TRUE, then the redeem script will evaluate to FALSE and the UTXO cannot be spent.

Variant Scripts

Figure 12:
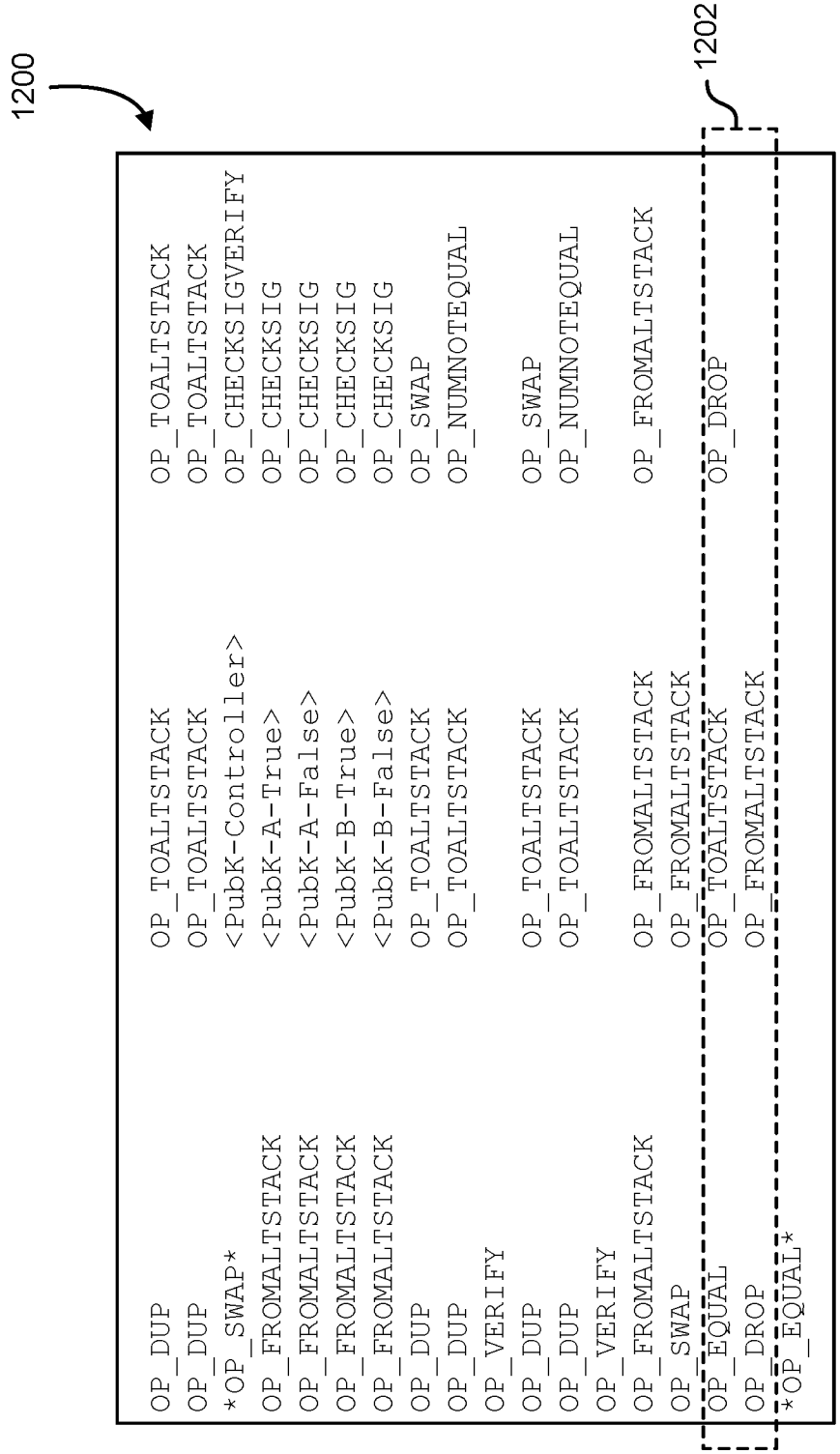

The full redeem script 1200 is shown in FIG. 12. This is then broken down into logical components for the convenience of the reader. The additions from the primary embodiment are shown *with asterisks* (deletions are shown ~between tildes~).

The instruction codes within the box 1202 demonstrate the NOR gate payload code above the signature manipulation logic to bring the data into a format which can be validated.

Locking Script

The locking script is a standard Pay-to-Script-Hash model:

OP_HASH160 <Redeem Script Hash> OP_EQUAL

Unlocking Script

The unlocking script for this pattern of logic gates is:

<Sig-Controller> <Signal-Required> <Sig-A-Used> <Sig-B-Used>
<RS Block 1>

Where:
<Sig-A-Used> is either <Sig-A-True> or <Sig-A-False>
<Sig-B-Used> is either <Sig-B-True> or <Sig-B-False>
<Signal-Required> is either TRUE or FALSE (1 or 0)

Variant 2: Generating a Concealed TRUE & FALSE Signal

Figure 5:
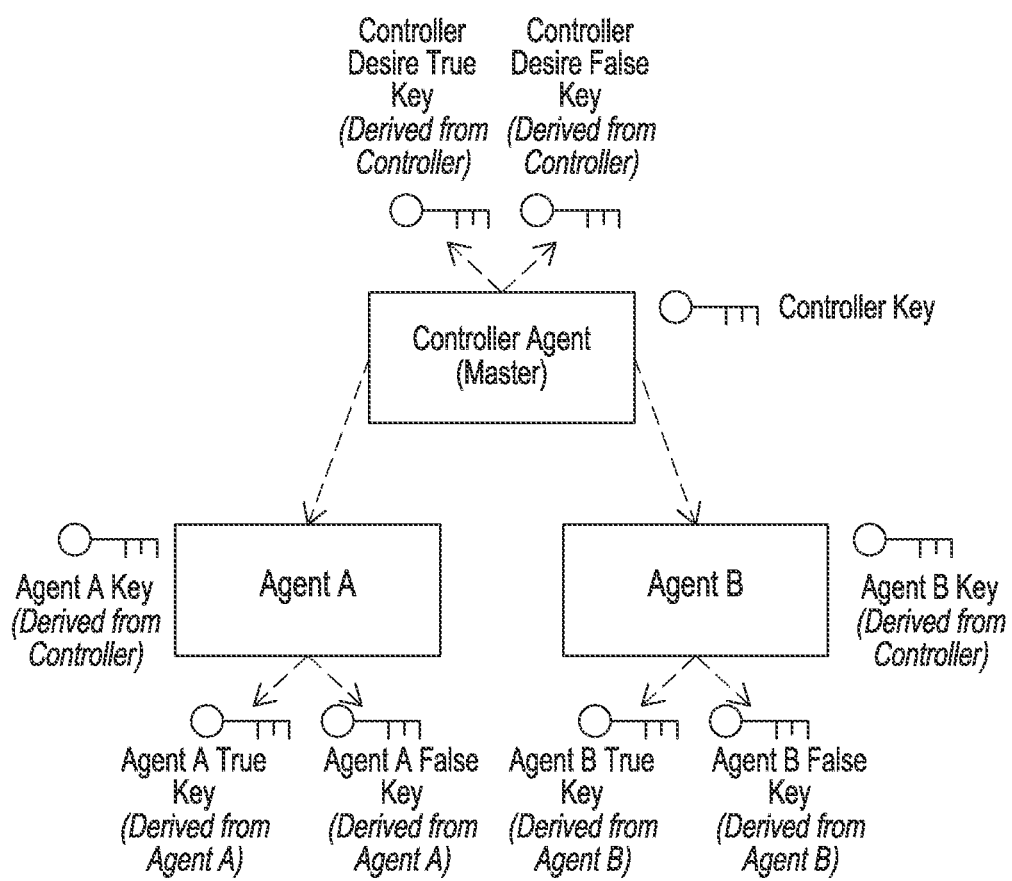
FIG. 5 shows an overview of a further embodiment of the invention.

Variant 1 has a minor disadvantage that it is public knowledge (from the redeem script) whether a true or false condition was signalled from the script. Embedding the desired signal inside the signature from the Controller avoids this issue. In variant 2, the Controller has two public keys derived from its primary key as shown in FIG. 5.

Variant Scripts

The full redeem script 1300 is shown in FIG. 13. This is then broken down into logical components. The additions from the primary embodiment are shown *with asterisks* (deletions are shown ~between tildes~).

The instruction codes within the box 1302 demonstrate the NOR gate payload code above the signature manipulation logic to bring the data into a format which can be validated.

Locking Script

The locking script is a standard Pay-to-Script-Hash model:

OP_HASH160 <Redeem Script Hash> OP_EQUAL

Unlocking Script

The unlocking script for this pattern of logic gates is:

~<Sig-Controller>~ *<Sig-Control-Desired>* <Sig-A-Used> <Sig-B-Used>
<RS Block 1>

Where:
<Sig-A-Used> is either <Sig-A-True> or <Sig-A-False>
<Sig-B-Used> is either <Sig-B-True> or <Sig-B-False>
<Sig-Control-Desire> is either <Sig-Control-Desire-True> or <Sig-Control-Desire-False>

Variant 3: Single Code Stack

It is possible to implement these gates using the single stack, rather than making use of the alt stack.

Redeem Script: Overview and NOR

Figure 14:
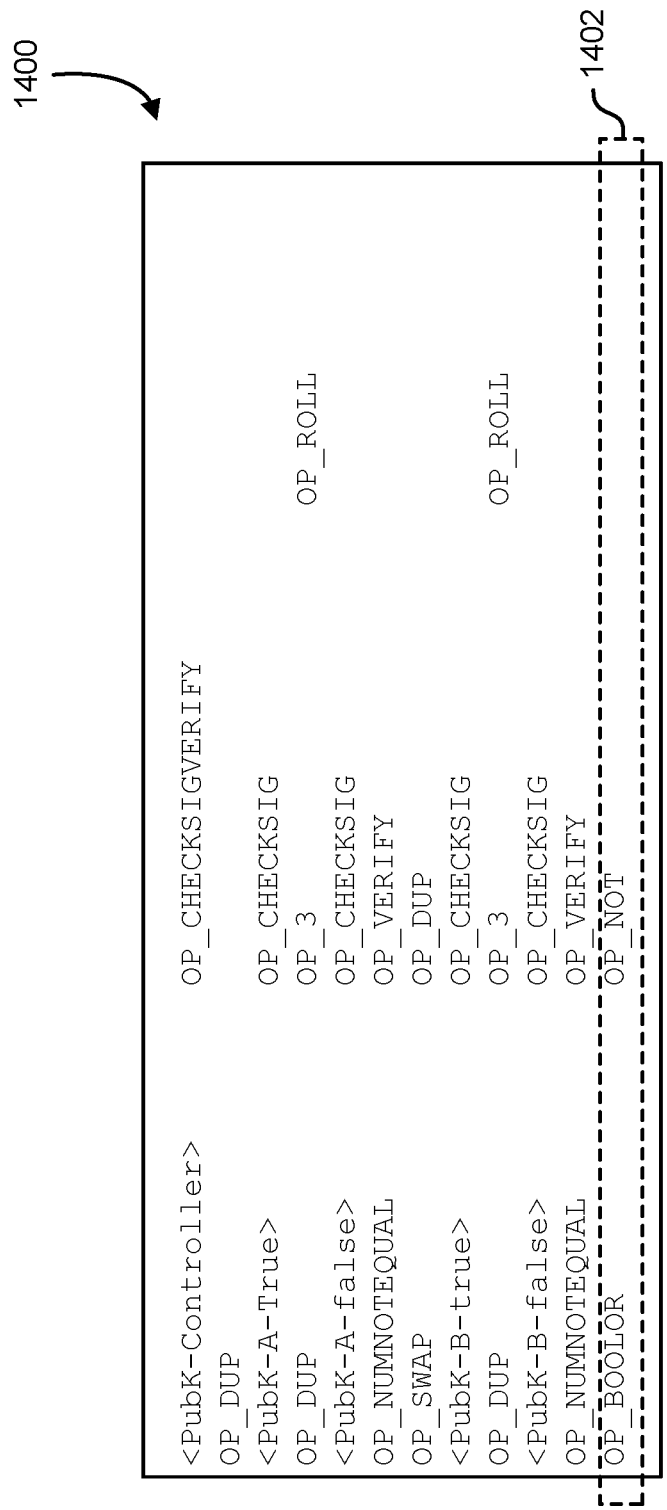

The full redeem script 1400 is shown in FIG. 14. This is then broken down into logical components.

The instruction codes within the box 1402 demonstrate the NOR gate payload code above the signature manipulation logic to bring the data into a format which can be validated. All stacks are shown in top to bottom ordering.

Locking Script

The locking script is a standard Pay-to-Script-Hash model:

OP_HASH160 <Redeem Script Hash> OP_EQUAL

Unlocking Script

The unlocking script for this pattern of logic gates is (note the different ordering of the signature blocks):

<Sig-B-Used><Sig-A-Used><Sig-Controller><RS Block 1>

Where:

<Sig-A-Used> is either <Sig-A-True> or <Sig-A-False>
<Sig-B-Used> is either <Sig-B-True> or <Sig-B-False>

Alternative Gates

To implement the alternative logic gates, replace the explicit NOR code in the box 1402 with the following:

| Name | Block Purpose |
| --- | --- |
| AND | OP_BOOLAND |
| OR | OP_BOOLOR |
| NAND | OP_BOOLAND OP_NOT |
| XOR | OP_NUMNOTEQUAL |
| XNOR | OP_NUMEQUAL |
| IMPLY | OP_SWAP OP_NOT OP_BOOLOR |
| Converse Implication | OP_NOT OP_BOOLOR |
| Material Non-implication | OP_NOT OP_BOOLAND |
| Converse Non-implication | OP_SWAP OP_NOT OP_BOOLAND |

Scenario: Burglar Alarm Setting (NOR Gate)

A simple example for the above embodiment utilising the NOR gate is the setting of a burglar alarm.

In this example, Agent A is a door sensor on the loading bay door that signals TRUE when the door is open and FALSE when closed.

Agent B is also a door sensor, but on the cash safe within the building. It also signals TRUE when the door is open and FALSE when closed. The controller is the central alarm system and it will only set the alarm if all doors within the building are closed. So, when the controller is requested to set the alarm, it will broadcast a transaction to the various monitoring agents. The transaction will complete only when Agent A and Agent B signal that their respective doors are closed.

We now describe a technique for generating a new key from a base key, as discussed above.

Creating a Key Using a Shared Secret

The following technique is described with reference to FIGS. 5 to 9.

Using the following technique, a key may be securely held or recreated. Particularly, in the case of a private key which may be used to derive a public key, the private key may be stored in parts.

The user, i.e., Alice or Bob, may keep one part of their private key, a service provider may keep a second part and a third part may be kept at a remote secure site. The private key may be reconstituted using any two of the three parts, or, more generally, the private key may be reconstituted using any m of n parts.

If the private key can be reconstituted then it can be used to recreate a public key at the point of use and then the private key and the public key can be discarded again after use. Splitting private keys may be achieved using Shamir's Secret Sharing Scheme. Private key-public key pairs may be deterministically derived from a master key using the following method. This method enables secret values to be shared by participants without ever transmitting them.

The system may generate a public key for a participant using a method of sub-key generation as now described.

FIG. 5 illustrates a system 1 that includes a first node 3 which is in communication with a second node 7 over a communications network 5. The first node 3 has an associated first processing device 23 and the second node 5 has an associated second processing device 27.

The first and second nodes 3, 7 may include an electronic device, such as a computer, phone, tablet computer, mobile communication device, computer server etc. In one example, the first node 3 may be a client (user) device and the second node 7 may be a server. The server may be a digital wallet provider's server.

The first node 3 is associated with a first asymmetric cryptography pair having a first node master private key ($V_{1C}$) and a first node master public key ($P_{1C}$). The second node (7) is associated with a second asymmetric cryptography pair having a second node master private key ($V_{1S}$) and a second node master public key ($P_{1S}$). In other words, the first and second nodes are each in possession of respective public-private key pairs.

The first and second asymmetric cryptography pairs for the respective first and second nodes 3, 7 may be generated during a registration process, such as registration for a wallet. The public key for each node may be shared publicly, such as over communications network 5.

To determine a common secret (CS) at both the first node 3 and second node 7, the nodes 3, 7 perform steps of respective methods 300, 400 without communicating private keys over the communications network 5.

The method 300 performed by the first node 3 includes determining 330 a first node second private key ($V_{2C}$) based on at least the first node master private key ($V_{1C}$) and a Generator Value (GV). The Generator Value may be based on a message (M) that is a shared between the first and second nodes, which may include sharing the message over the communications network 5 as described in further detail below. The method 300 also includes determining 370 a second node second public key ($P_{2S}$) based on at least the second node master public key ($P_{1S}$) and the Generator Value (GV). The method 300 includes determining 380 the common secret (CS) based on the first node second private key ($V_{2C}$) and the second node second public key ($P_{2S}$).

Importantly, the same common secret (CS) can also be determined at the second node 7 by method 400. The method 400 includes determining 430 a first node second public key ($P_{2C}$) based on the first node master public key ($P_{1C}$) and the Generator Value (GV). The method 400 further include determining 470 a second node second private key ($V_{2S}$) based on the second node master private key ($V_{1S}$) and the Generator Value (GV). The method 400 includes determining 480 the common secret (CS) based on the second node second private key ($V_{2S}$) and the first node second public key ($P_{2C}$).

The communications network 5 may include a local area network, a wide area network, cellular networks, radio communication network, the internet, etc. These networks, where data may be transmitted via communications medium such as electrical wire, fibre optic, or wirelessly may be susceptible to eavesdropping, such as by an eavesdropper 11. The method 300, 400 may allow the first node 3 and second node 7 to both independently determine a common secret without transmitting the common secret over the communications network 5.

Thus one advantage is that the common secret (CS) may be determined securely and independently by each node without having to transmit a private key over a potentially unsecure communications network 5. In turn, the common secret may be used as a secret key (or as the basis of a secret key).

The methods 300, 400 may include additional steps. The method 300 may include, at the first node 3, generating a signed message (SM1) based on the message (M) and the first node second private key ($V_{2C}$). The method 300 further includes sending 360 the first signed message (SM1), over the communications network, to the second node 7. In turn, the second node 7 may perform the steps of receiving 440 the first signed message (SM1).

The method 400 also includes the step of validating 450 the first signed message (SM2) with the first node second public key ($P_{2C}$) and authenticating 460 the first node 3 based on the result of validating the first signed message (SM1). Advantageously, this allows the second node 7 to authenticate that the purported first node (where the first signed message was generated) is the first node 3. This is based on the assumption that only the first node 3 has access to the first node master private key ($V_{1C}$) and therefore only the first node 3 can determine the first node second private key ($V_{2C}$) for generating the first signed message (SM1). It is to be appreciated that similarly, a second signed message (SM2) can be generated at the second node 7 and sent to the first node 3 such that the first node 3 can authenticate the second node 7, such as in a peer-to-peer scenario.

Sharing the message (M) between the first and second nodes may be achieved in a variety of ways. In one example, the message may be generated at the first node 3 which is then sent, over the communications network 5, the second node 7. Alternatively, the message may be generated at the second node 7 and then sent, over the communications network 5, to the second node 7. In some examples, the message (M) may be public and therefore may be transmitted over an unsecure network 5. One or more messages (M) may be stored in a data store 13, 17, 19. The skilled person will realise that sharing of the message can be achieved in a variety of ways.

Advantageously, a record to allow recreation of the common secret (CS) may be kept without the record by itself having to be stored privately or transmitted securely.

Method of Registration 100, 200

An example of a method of registration 100, 200 is now described in which method 100 is performed by the first node 3 and method 200 is performed by the second node 7. This includes establishing the first and second asymmetric cryptography pairs for the respective first and second nodes 3, 7. The asymmetric cryptography pairs include associated private and public keys, such as those used in public-key encryption. In this example, the asymmetric cryptography pairs are generated using Elliptic Curve Cryptography (ECC) and properties of elliptic curve operations.

In the method 100, 200, this includes the first and second nodes agreeing 110, 210 on a common ECC system and using a base point (G). (Note: the base point could be referred to as a Common Generator, but the term 'base point' is used to avoid confusion with the Generator Value GV). In one example, the common ECC system may be based on secp256K1 which is an ECC system used by Bitcoin. The base point (G) may be selected, randomly generated, or assigned.

Turning now to the first node 3, the method 100 includes settling 110 on the common ECC system and base point (G). This may include receiving the common ECC system and base point from the second node 7, or a third node 9. Alternatively, a user interface 15 may be associated with the first node 3, whereby a user may selectively provide the common ECC system and/or base point (G). In yet another alternative one or both of the common ECC system and/or base point (G) may be randomly selected by the first node 3. The first node 3 may send, over the communications network 5, a notice indicative of using the common ECC system with a base point (G) to the second node 7. In turn, the second node 7 may settle 210 by sending a notice indicative of an acknowledgment to using the common ECC system and base point (G).

The method 100 also includes the first node 3 generating 120 a first asymmetric cryptography pair that includes the first node master private key ($V_{1C}$) and the first node master public key ($P_{1C}$). This includes generating the first master private key ($V_{1C}$) based, at least in part, on a random integer in an allowable range specified in the common ECC system. This also includes determining the first node master public key ($P_{1C}$) based on elliptic curve point multiplication of the first node master private key ($P_{1C}$) and the base point (G) according to the formula:

$$P_{1C} = V_{1C} \times G \quad \text{(Equation 1)}$$

Thus the first asymmetric cryptography pair includes:
$V_{1C}$: The first node master private key that is kept secret by the first node.
$P_{1C}$: The first node master public key that is made publicly known.

The first node 3 may store the first node master private key ($V_{1C}$) and the first node master public key ($P_{1C}$) in a first data store 13 associated with the first node 3. For security, the first node master private key ($V_{1C}$) may be stored in a secure portion of the first data store 13 to ensure the key remains private.

Figure 6:
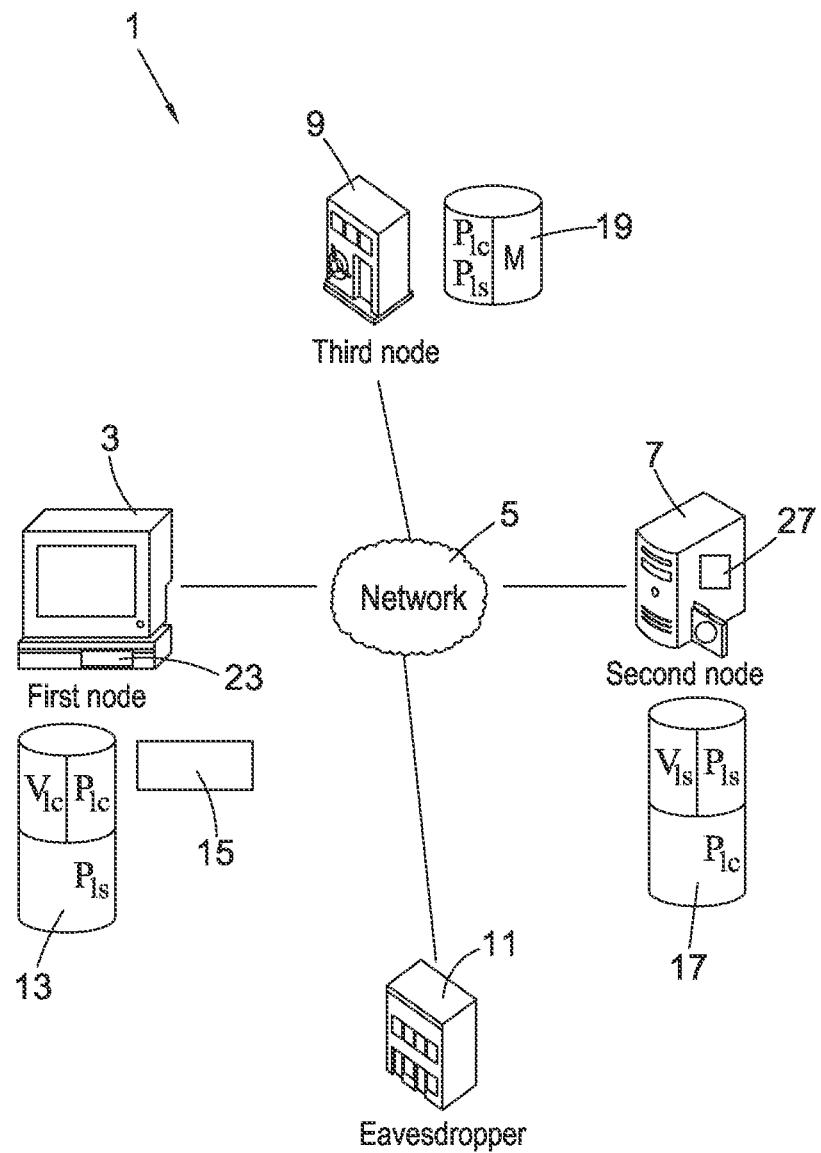
FIGS. 6 to 10 show a technique for generating a cryptographic key from a base key.
Figure 7:
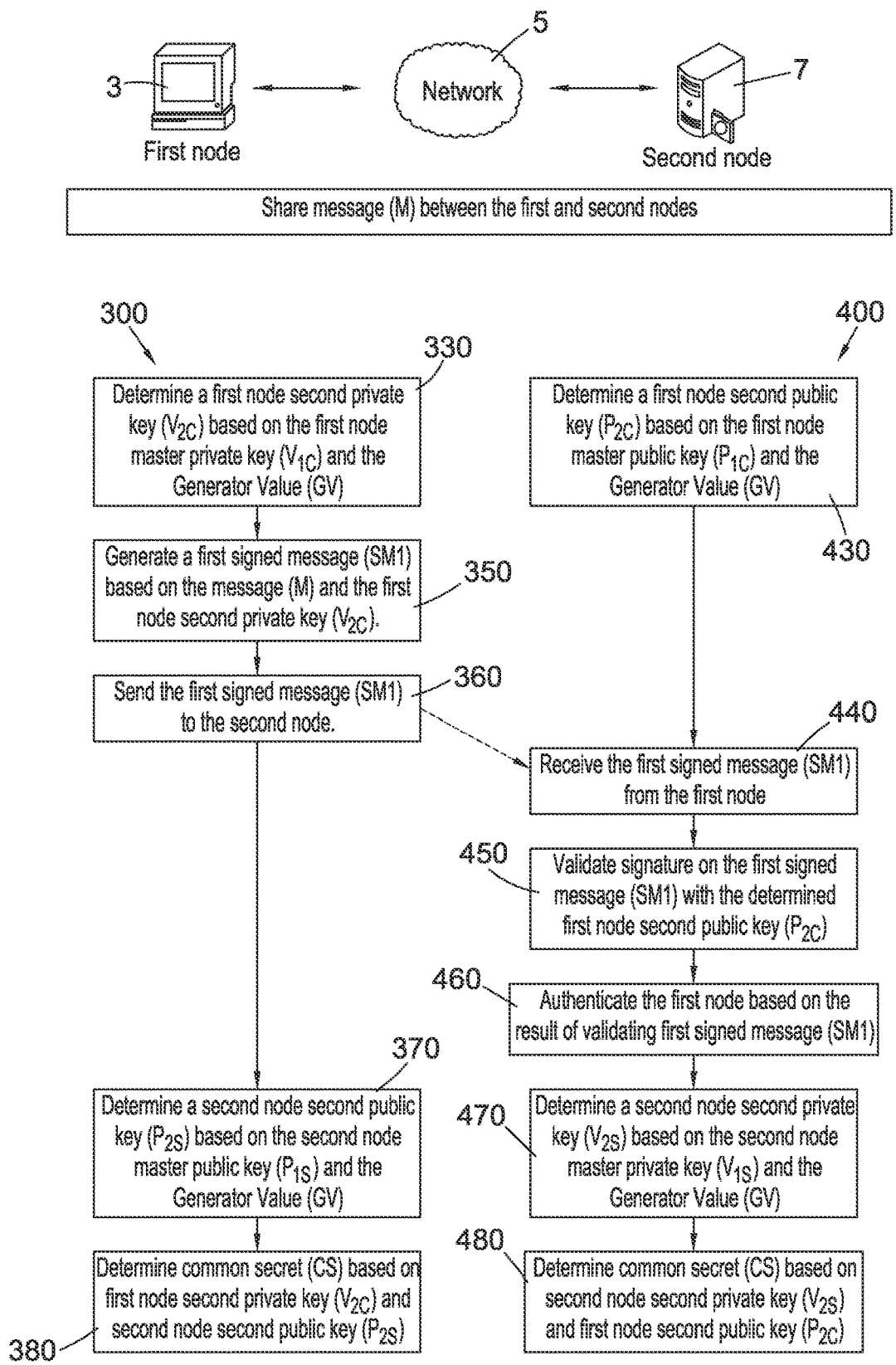
Figure 8:
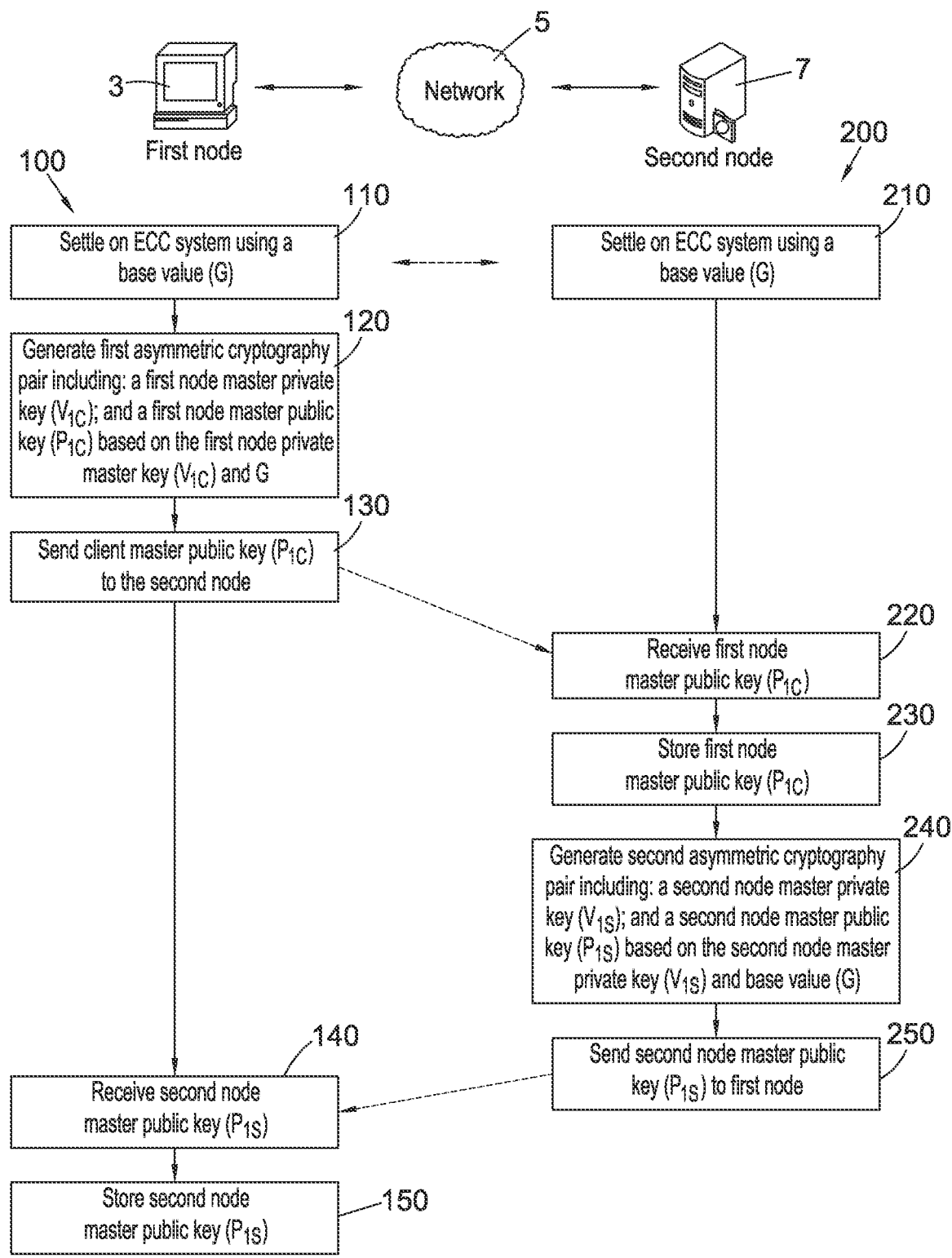
Figure 9:
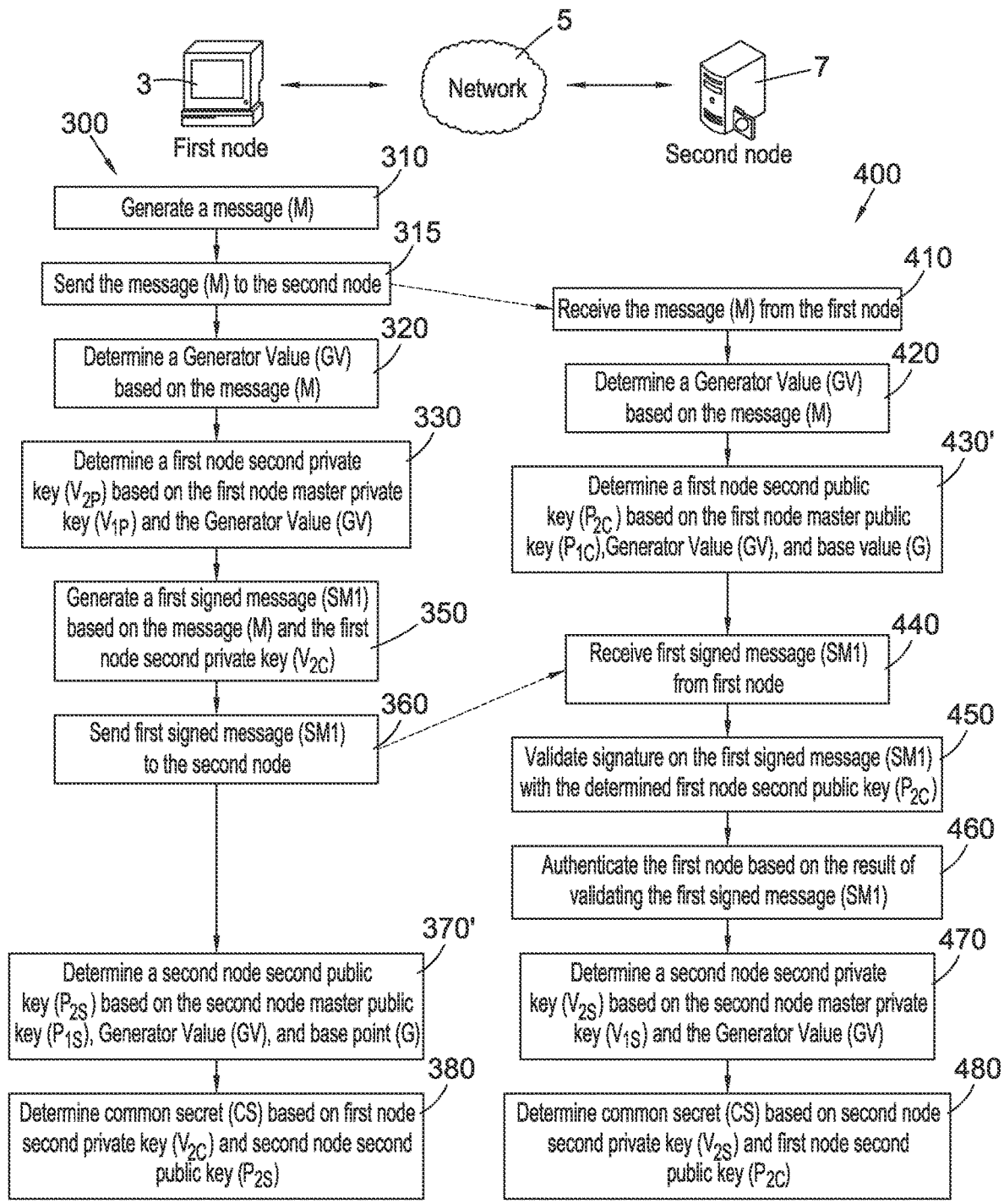
Figure 10:
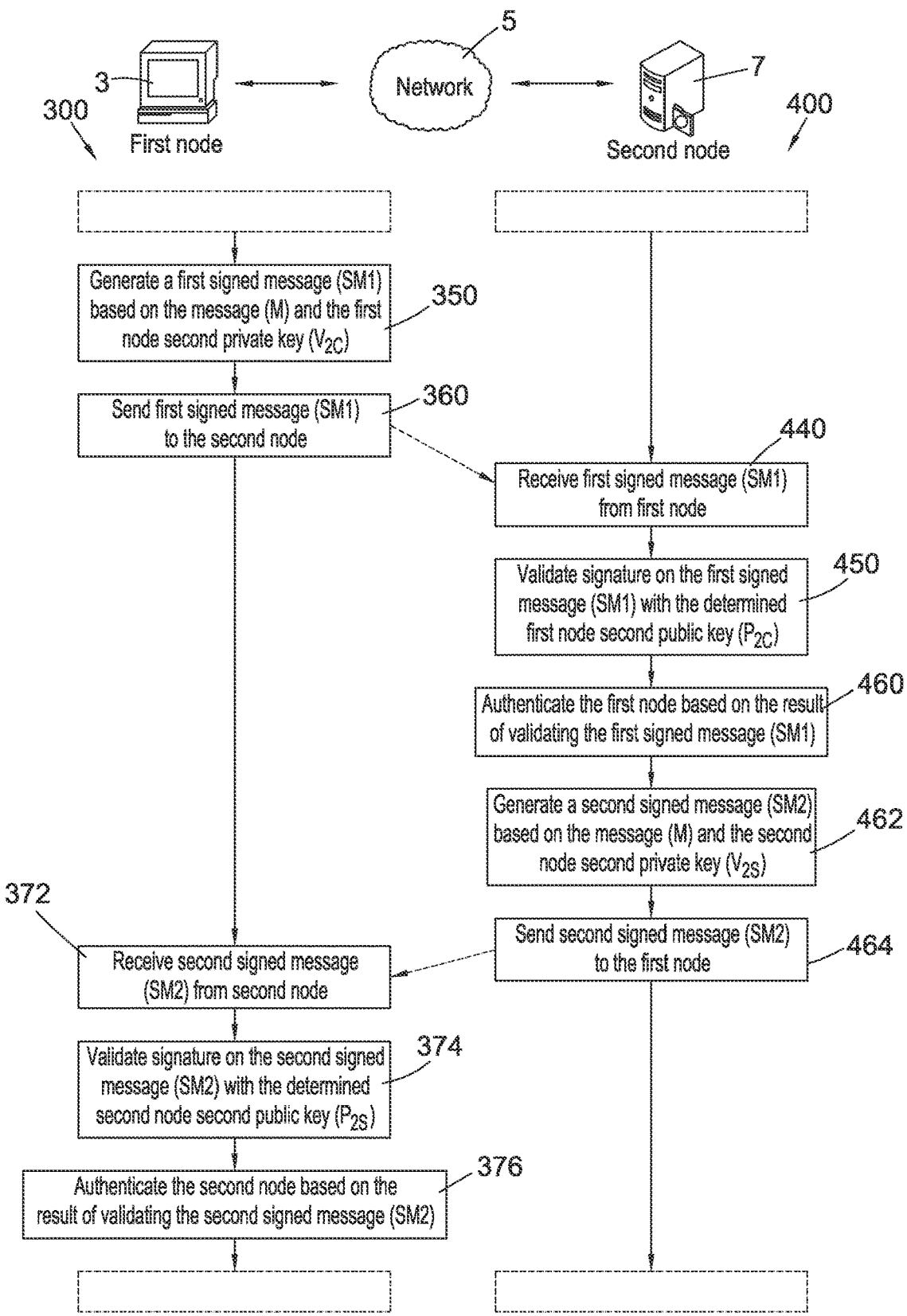

The method 100 further includes sending 130 the first node master public key ($P_{1C}$), over the communications network 5, to the second node 7, as shown in FIG. 6. The second node 7 may, on receiving 220 the first node master public key ($P_{1C}$), store 230 the first node master public key ($P_{1C}$) in a second data store 17 associated with the second node 7.

Similar to the first node 3, the method 200 of the second 7 includes generating 240 a second asymmetric cryptography pair that includes the second node master private key ($V_{1S}$) and the second node master public key ($P_{1S}$). The second node master private key ($V_{1S}$) is also a random integer within the allowable range. In turn, the second node master public key ($P_{1S}$) is determined by the following formula:

$$P_{1S} = V_{1S} \times G \quad \text{(Equation 2)}$$

Thus the second asymmetric cryptography pair includes:
$V_{1S}$: The second node master private key that is kept secret by the second node.
$P_{1S}$: The second node master public key that is made publicly known.

The second node 7 may store the second asymmetric cryptography pair in the second data store 17. The method 200 further includes sending 250 the second node master public key ($P_{1S}$) to the first node 3. In turn, the first node 3 may receive 140 and stores 150 the second node master public key ($P_{1S}$).

It is to be appreciated that in some alternatives, the respective public master keys may be received and stored at a third data store 19 associated with the third node 9 (such as a trusted third party). This may include a third party that acts as a public directory, such as a certification authority. Thus in some examples, the first node master public key ($P_{1C}$) may requested and received by the second node 7 only when determining the common secret (CS) is required (and vice versa).

The registration steps may only need to occur once as an initial setup.

Session Initiation and Determining the Common Secret by the First Node 3

An example of determining a common secret (CS) will now be described. The common secret (CS) may be used for a particular session, time, transaction, or other purpose between the first node 3 and the second node 7 and it may not be desirable, or secure, to use the same common secret (CS). Thus the common secret (CS) may be changed between different sessions, time, transactions, etc.

The following is provided for illustration of the secure transmission technique which has been described above.

Generating a Message (M) 310

In this example, the method 300 performed by the first node 3 includes generating 310 a message (M). The message (M) may be random, pseudo random, or user defined. In one example, the message (M) is based on Unix time and a nonce (and arbitrary value). For example, the message (M) may be provided as:

$$\text{Message } (M) = \text{UnixTime} + \text{nonce} \quad \text{(Equation 3)}$$

In some examples, the message (M) is arbitrary. However it is to be appreciated that the message (M) may have selective values (such as Unix Time, etc) that may be useful in some applications.

The method 300 includes sending 315 the message (M), over the communications network 3, to the second node 7. The message (M) may be sent over an unsecure network as the message (M) does not include information on the private keys.

Determining a Generator Value (GV) 320

The method 300 further includes the step of determining 320 a Generator Value (GV) based on the message (M). In this example, this includes determining a cryptographic hash of the message. An example of a cryptographic hash algorithm includes SHA-256 to create a 256-bit Generator Value (GV). That is:

$$GV = \text{SHA-256}(M) \quad \text{(Equation 4)}$$

It is to be appreciated that other hash algorithms may be used. This may include other has algorithms in the Secure Hash Algorithm (SHA) family. Some particular examples include instances in the SHA-3 subset, including SHA3-224, SHA3-256, SHA3-384, SHA3-512, SHAKE128, SHAKE256. Other hash algorithms may include those in the RACE Integrity Primitives Evaluation Message Digest (RIPEMD) family. A particular example may include RIPEMD-160. Other hash functions may include families based on Zémor-Tillich hash function and knapsack-based hash functions.

Determining a First Node Second Private Key 330

The method 300 then includes the step 330 of determining 330 the first node second private key ($V_{2C}$) based on the second node master private key ($V_{1C}$) and the Generator Value (GV). This can be based on a scalar addition of the first node master private key ($V_{1C}$) and the Generator Value (GV) according to the following formula:

$$V_{2C} = V_{1C} + GV \quad \text{(Equation 5)}$$

Thus the first node second private key ($V_{2C}$) is not a random value but is instead deterministically derived from the first node master private key. The corresponding public key in the cryptographic pair, namely the first node second public key ($P_{2C}$), has the following relationship:

$$P_{2C} = V_{2C} \times G \quad \text{(Equation 6)}$$

Substitution of $V_{2C}$ from Equation 5 into Equation 6 provides:

$$P_{2C} = (V_{1C} + GV) \times G \quad \text{(Equation 7)}$$

where the '+' operator refers to elliptic curve point addition. Noting that elliptic curve cryptography algebra is distributive, Equation 7 may be expressed as:

$$P_{2C} = V_{1C} \times G + GV \times G \quad \text{(Equation 8)}$$

Finally, Equation 1 may be substituted into Equation 7 to provide:

$$P_{2C} = P_{1C} + GV \times G \quad \text{(Equation 9.1)}$$

$$P_{2C} = P_{1C} + \text{SHA-256}(M) \times G \quad \text{(Equation 9.2)}$$

Thus the corresponding first node second public key ($P_{2C}$) can be derivable given knowledge of the first node master public key ($P_{1C}$) and the message (M). The second node 7 may have such knowledge to independently determine the first node second public key ($P_{2C}$) as will be discussed in further detail below with respect to the method 400.

Generate a First Signed Message (SM1) Based on the Message and the First Node Second Private Key 350

The method 300 further includes generating 350 a first signed message (SM1) based on the message (M) and the determined first node second private key ($V_{2C}$). Generating a signed message includes applying a digital signature algorithm to digitally sign the message (M). In one example, this includes applying the first node second private key ($V_{2C}$) to the message in an Elliptic Curve Digital Signature Algorithm (ECDSA) to obtain the first signed message (SM1). Examples of ECDSA include those based on ECC systems with secp256k1, secp256r1, secp384r1, se3cp521r1.

The first signed message (SM1) can be verified with the corresponding first node second public key ($P_{2C}$) at the second node 7. This verification of the first signed message (SM1) may be used by the second node 7 to authenticate the first node 3, which will be discussed in the method 400 below.

Determine a Second Node Second Public Key 370'

The first node 3 may then determine 370 a second node second public key ($P_{2S}$). As discussed above, the second node second public key ($P_{2S}$) may be based at least on the second node master public key ($P_{1S}$) and the Generator Value (GV). In this example, since the public key is determined 370' as the private key with elliptic curve point multiplication with the base point (G), the second node second public key ($P_{2S}$) can be expressed, in a fashion similar to Equation 6, as:

$$P_{2S} = V_{2S} \times G \quad \text{(Equation 10.1)}$$

$$P_{2S} = P_{1S} + GV \times G \quad \text{(Equation 10.2)}$$

The mathematical proof for Equation 10.2 is the same as described above for deriving Equation 9.1 for the first node second public key ($P_{2C}$). It is to be appreciated that the first node 3 can determine 370 the second node second public key independently of the second node 7.

Determine the Common Secret 380 at the First Node 3

The first node 3 may then determine 380 the common secret (CS) based on the determined first node second private key ($V_{2C}$) and the determined second node second public key ($P_{2S}$). The common secret (CS) may be determined by the first node 3 by the following formula:

$$S = V_{2C} \times P_{2S} \quad \text{(Equation 11)}$$

Method 400 Performed at the Second Node 7

The corresponding method 400 performed at the second node 7 will now be described. It is to be appreciated that some of these steps are similar to those discussed above that were performed by the first node 3.

The method 400 includes receiving 410 the message (M), over the communications network 5, from the first node 3. This may include the message (M) sent by the first node 3 at step 315. The second node 7 then determines 420 a Generator Value (GV) based on the message (M). The step of determining 420 the Generator Value (GV) by the second node 7 is similar to the step 320 performed by the first node described above. In this example, the second node 7 performs this determining step 420 independent of the first node 3.

The next step includes determining 430 a first node second public key ($P_{2C}$) based on the first node master public key ($P_{1C}$) and the Generator Value (GV). In this example, since the public key is determined 430' as the private key with elliptic curve point multiplication with the base point (G), the first node second public key ($P_{2C}$) can be expressed, in a fashion similar to Equation 9, as:

$$P_{2C} = V_{2C} \times G \quad \text{(Equation 12.1)}$$

$$P_{2C} = P_{1C} + GV \times G \quad \text{(Equation 12.2)}$$

The mathematical proof for Equations 12.1 and 12.2 is the same as those discussed above for Equations 10.1 and 10.2.

The Second Node 7 Authenticating the First Node 3

The method 400 may include steps performed by the second node 7 to authenticate that the alleged first node 3, is the first node 3. As discussed previously, this includes receiving 440 the first signed message (SM1) from the first node 3. The second node 7 may then validate 450 the signature on the first signed message (SM1) with the first node second public key ($P_{2C}$) that was determined at step 430.

Verifying the digital signature may be done in accordance with an Elliptic Curve Digital Signature Algorithm (ECDSA) as discussed above. Importantly, the first signed message (SM1) that was signed with the first node second private key ($V_{2C}$) should only be correctly verified with the corresponding first node second public key ($P_{2C}$), since $V_{2C}$ and $P_{2C}$ form a cryptographic pair. Since these keys are deterministic on the first node master private key ($V_{1C}$) and the first node master public key ($P_{1C}$) that were generated at registration of the first node 3, verifying first signed message (SM1) can be used as a basis of authenticating that an alleged first node sending the first signed message (SM1) is the same first node 3 during registration. Thus the second node 7 may further perform the step of authenticating (460) the first node 3 based on the result of validating (450) the first signed message.

The Second Node 7 Determining the Common Secret

The method 400 may further include the second node 7 determining 470 a second node second private key ($V_{2S}$) based on the second node master private key ($V_{1S}$) and the Generator Value (GV). Similar to step 330 performed by the first node 3, the second node second private key ($V_{2S}$) can be based on a scalar addition of the second node master private key ($V_{1S}$) and the Generator Value (GV) according to the following formulas:

$$V_{2S} = V_{1S} + GV \quad \text{(Equation 13.1)}$$

$$V_{2S} = V_{1S} + \text{SHA-256}(M) \quad \text{(Equation 13.2)}$$

The second node 7 may then, independent of the first node 3, determine 480 the common secret (CS) based on the second node second private key ($V_{2S}$) and the first node second public key ($P_{2C}$) based on the following formula:

$$S = V_{2S} \times P_{2C} \quad \text{(Equation 14)}$$

Proof of the Common Secret (CS) Determined by the First Node 3 and Second Node 7

The common secret (CS) determined by the first node 3 is the same as the common secret (CS) determined at the second node 7. Mathematical proof that Equation 11 and Equation 14 provide the same common secret (CS) will now be described.

Turning to the common secret (CS) determined by the first node 3, Equation 10.1 can be substituted into Equation 11 as follows:

$$S = V_{2C} \times P_{2S} \quad \text{(Equation 11)}$$

$$S = V_{2C} \times (V_{2S} \times G)$$

$$S = (V_{2C} \times V_{2S}) \times G \quad \text{(Equation 15)}$$

Turning to the common secret (CS) determined by the second node 7, Equation 12.1 can be substituted into Equation 14 as follows:

$$S = V_{2S} \times P_{2C} \quad \text{(Equation 14)}$$

$$S = V_{2S} \times (V_{2C} \times G)$$

$$S = (V_{2S} \times V_{2C}) \times G \quad \text{(Equation 16)}$$

Since ECC algebra is commutative, Equation 15 and Equation 16 are equivalent, since:

$$S = (V_{2C} \times V_{2S}) \times G = (V_{2S} \times V_{2C}) \times G \quad \text{(Equation 17)}$$

The Common Secret (CS) and Secret Key

The common secret (CS) may now be used as a secret key, or as the basis of a secret key in a symmetric-key algorithm for secure communication between the first node 3 and second node 7.

The common secret (CS) may be in the form of an elliptic curve point ($x_S$, $y_S$). This may be converted into a standard key format using standard publicly known operations agreed by the nodes 3, 7. For example, the $x_S$ value may be a 256-bit integer that could be used as a key for AES256 encryption. It could also be converted into a 160-bit integer using RIPEMD160 for any applications requiring this length key.

The common secret (CS) may be determined as required. Importantly, the first node 3 does not need to store the common secret (CS) as this can be re-determined based on the message (M). In some examples, the message(s) (M) used may be stored in data store 13, 17, 19 (or other data store) without the same level of security as required for the master private keys. In some examples, the message (M) may be publicly available.

However depending on some application, the common secret (CS) could be stored in the first data store (X) associated with the first node provided the common secret (CS) is kept as secure as the first node master private key ($V_{1C}$).

Advantageously, this technique can be used to determine multiple common secrets that may correspond to multiple secure secret keys based on a single master key cryptography pair.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented control method comprising the steps:
    generating a blockchain transaction comprising a redeem script for an output, wherein the blockchain transaction is generated by a computing agent, wherein the redeem script:
        i) specifies a plurality of public keys, each associated with a corresponding private key; and wherein each public key is uniquely associated with a potential state of at least one data source; and
        ii) comprises logic arranged to provide a result based on which of the corresponding private key is used to sign the unlocking script;
    wherein a minimum number of said private keys must be used to sign the unlocking script of a further blockchain transaction in order to spend the output.

2. The method according to claim 1, wherein the blockchain transaction is generated by a computing agent.

3. The method according to claim 1, wherein the blockchain transaction is generated autonomously.

4. The method according to claim 2, wherein each of the computing agents comprises an agent base key.

5. The method according to claim 3, wherein the blockchain transaction is generated autonomously based on inputs received from a sensor or other signal source.

6. The method according to claim 1, wherein the plurality of public keys is generated from a base key.

7. The method according to claim 6, wherein the plurality of public keys is generated using a deterministic key generation technique.

8. The method according to claim 1, wherein the logic is arranged to implement the functionality of a logic gate.

9. The method according to claim 8, wherein the logic gate is a NOT, AND, OR, NOR, XOR, IMPLY, NAND, NONIMPLY or XNOR gate.

10. The method according to claim 1, wherein the state of the at least one data source is determined by a computing agent.

11. The method according to claim 5, wherein the computing agent is in communication which a control computing agent.

12. The method according to claim 1, wherein the result is a Boolean result.

13. A computer-implemented system comprising:
    a processor and memory, the memory storing instructions that when executed by the processor, cause the professor to:
    generate a blockchain transaction comprising a redeem script for an output, wherein the blockchain transaction is generated by a computing agent, wherein the redeem script:
        i) specifies a plurality of public keys, each associated with a corresponding private key; and wherein each public key is uniquely associated with a potential state of at least one data source; and
        ii) comprises logic arranged to provide a result based on which of the corresponding private key is used to sign the unlocking script;
    wherein a minimum number of said private keys must be used to sign the unlocking script of a further blockchain transaction in order to spend the output.

14. The computer implemented system according to claim 13, wherein the instructions further cause the processor to:
    submit a transaction to a blockchain network;
    generate a transaction;
    digitally sign a locking script; and/or
    generate a public/private cryptographic key.

15. The system according to claim 13, wherein the result is used to control or influence the execution or operation of a process or apparatus.

16. The system according to claim 13, wherein the instructions include further instructions that cause at least one sensor or signal generation component to provide an input to the processor.

* * * * *